United States Patent [19]
Harrison et al.

[11] Patent Number: 5,281,954
[45] Date of Patent: Jan. 25, 1994

[54] DEVICE FOR REPLACING BATTERY IN SMOKE ALARM

[75] Inventors: Frank Harrison, P.O. Box 411824, Kansas City, Mo. 64141; Charles Harrison, Kansas City, Mo.

[73] Assignee: Frank Harrison, Kansas City, Mo.

[21] Appl. No.: 841,012

[22] Filed: Feb. 25, 1992

[51] Int. Cl.⁵ .............................................. G08B 17/10
[52] U.S. Cl. ...................................... 340/628; 340/693
[58] Field of Search ............... 340/628, 693, 627, 632; 429/96, 97, 98, 99, 100; 381/69

[56] References Cited

U.S. PATENT DOCUMENTS

| | | | |
|---|---|---|---|
| 4,138,531 | 2/1979 | Thompson | 429/100 X |
| 4,152,551 | 5/1979 | Hiller | 381/69 |
| 5,149,038 | 9/1992 | VanCleve | 340/628 X |

Primary Examiner—Jeffrey Hofsass
Attorney, Agent, or Firm—Hovey, Williams, Timmons & Collins

[57] ABSTRACT

A device for replacing a battery in a battery powered apparatus such as a smoke alarm is provided which permits the battery to be replaced from a location remote from the battery connector of the apparatus. The device hereof includes a guide track in the form of an elongated tube and means shiftable therealong for carrying a battery between the battery connector and the portion of the tube proximal to the user. A rod is provided for shifting a carriage preferably located within the tube. The carriage is preferably configured to present the battery to the battery connector with the terminals oriented to engage the battery connector and press the battery into position. On the retrieval stroke, the carriage is configured to pull the battery out of engagement with the battery connector and carry it to the end of the tube proximal to the user where the battery may be pushed through a port in the tube and readily replaced.

16 Claims, 2 Drawing Sheets

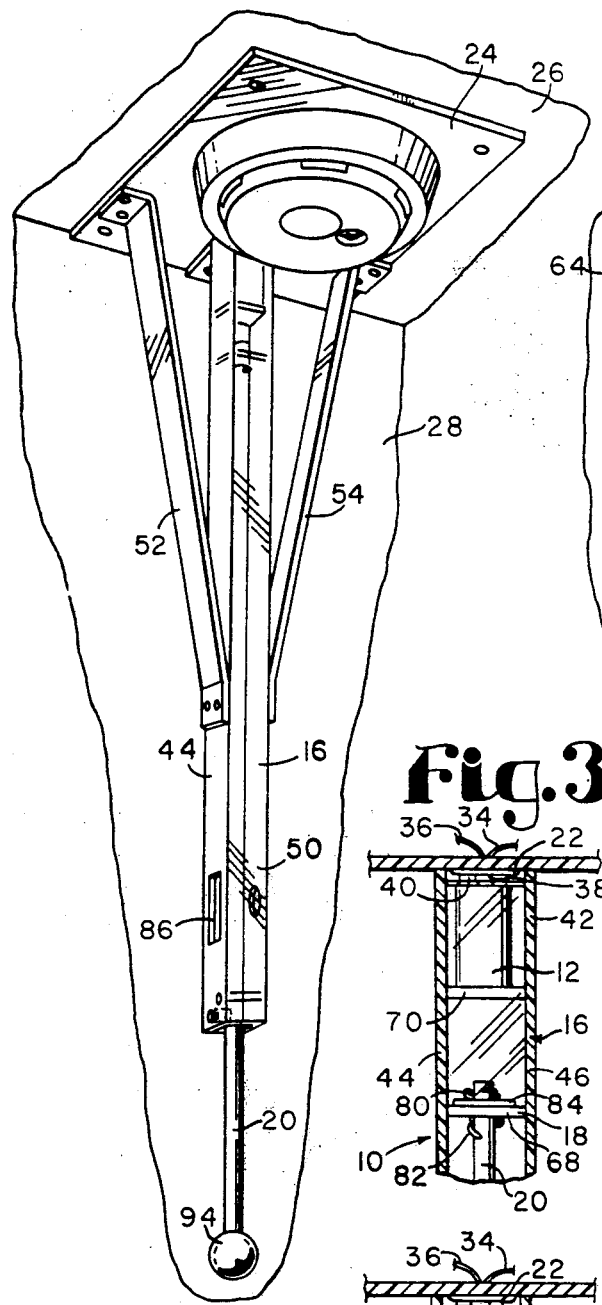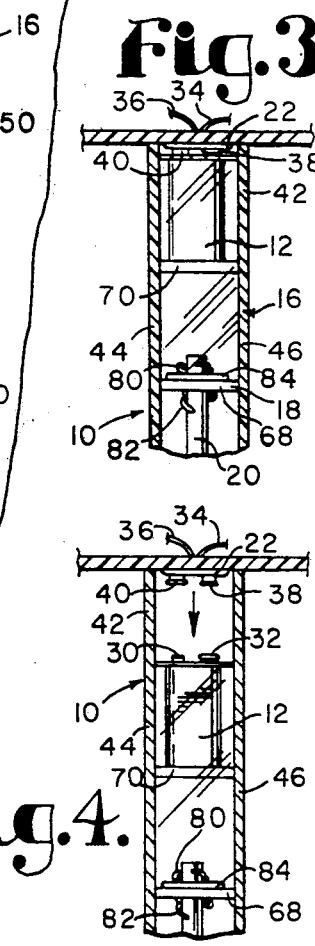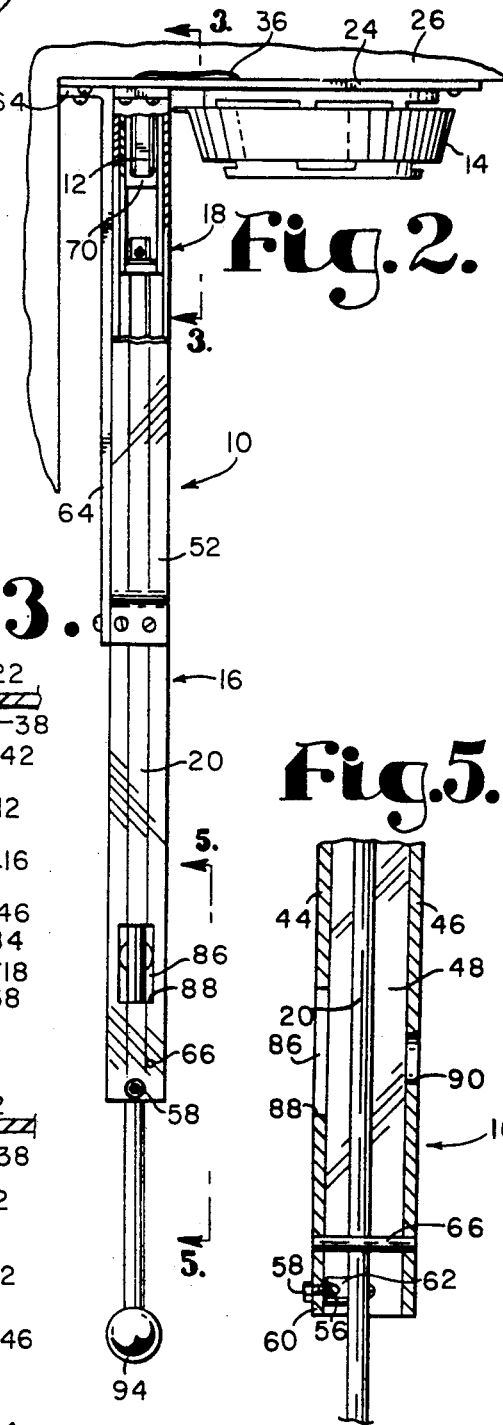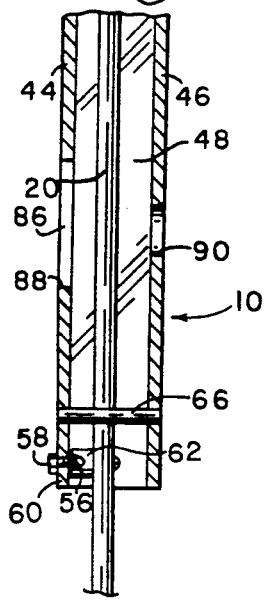

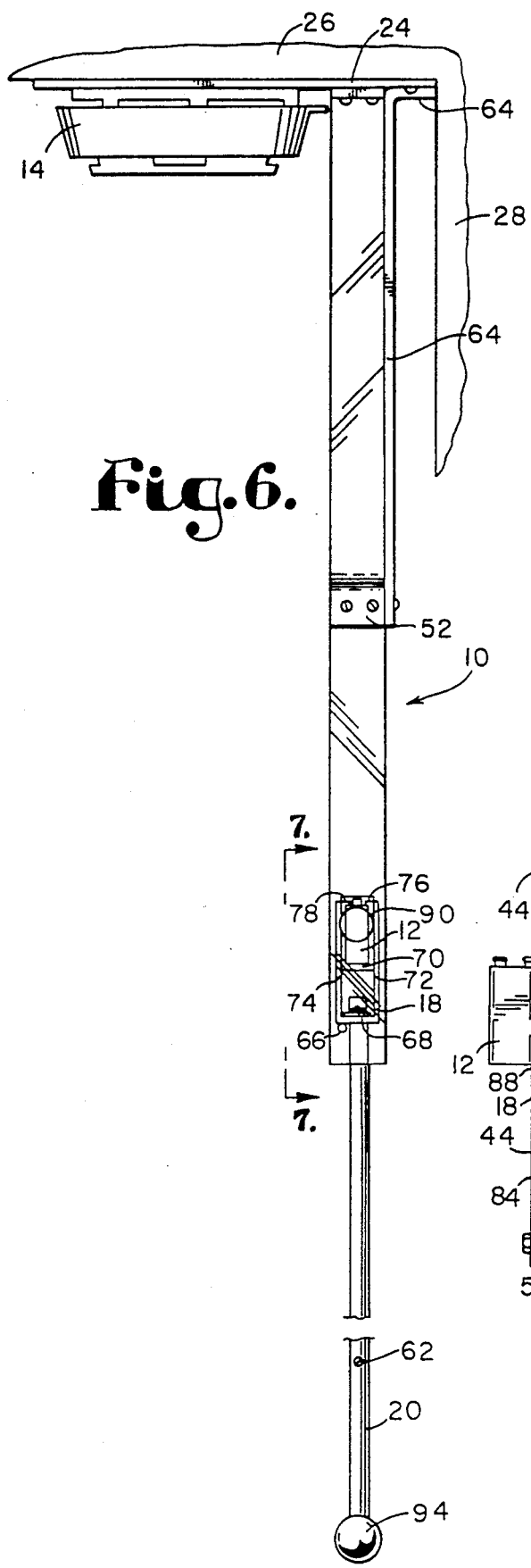
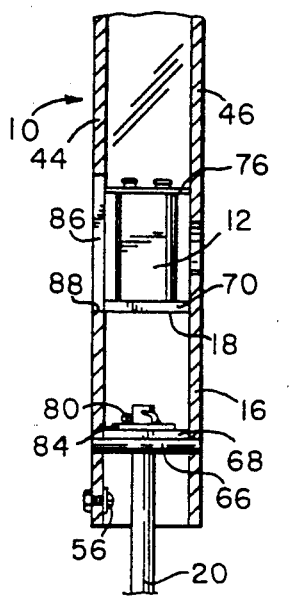
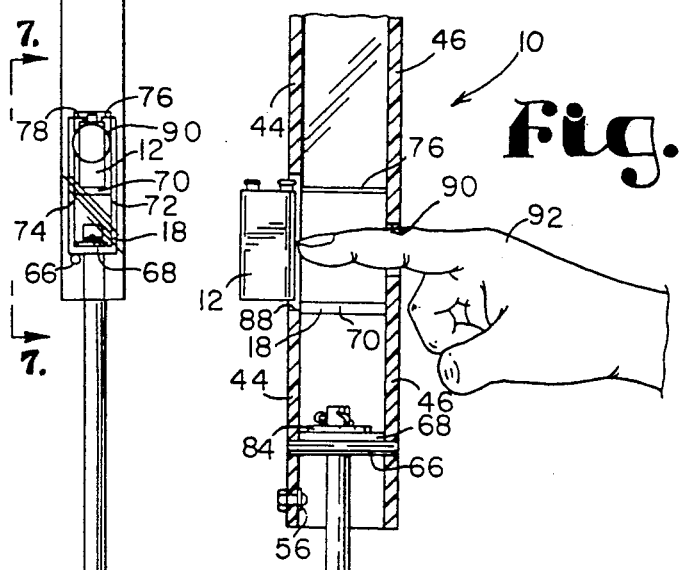

DEVICE FOR REPLACING BATTERY IN SMOKE ALARM

BACKGROUND OF THE INVENTION

1. Field of the Invention

This invention is concerned with a device which permits the battery powering a smoke alarm to be manipulated from a remote location and thereafter replaced. By using a reciprocating carriage along a guide track, the battery may be readily replaced without the necessity of climbing ladders or the like.

2. Description of the Prior Art

Smoke alarms are beneficial additions to many buildings which have resulted in the savings of many lives and prevented extensive damage to the structure. Home smoke alarms are relatively inexpensive and may be installed without professional assistance in most instances. These alarms are typically powered by a conventional 9 volt battery and the smoke alarm will not work without a battery or if the battery is discharged. To provide the most effective protection, home smoke alarms are typically located near the ceiling so that they may provide early detection of the rising smoke.

Unfortunately, this places the smoke alarm out of reach of many homeowners. In order to replace the battery, a ladder must often be obtained. Typically, the user must open the casing of the smoke alarm after climbing the ladder and then replace the battery which is snap connected to a battery connector located therein. These can be especially difficult tasks for elderly users of those with arthritis who have trouble removing the casing or risk serious injury if they should fall from the ladder.

U.S. Pat. No. 4,600,314 to Theriault discloses a mountable remote cutoff timer for a smoke detector which is designed to be positioned remotely from the smoke detector. While the remote unit disclosed therein permits the replacement of batteries more easily, it requires manual manipulation of the battery which may be difficult for elderly and arthritic users. The Theriault device moreover requires that the battery itself be within reach and involves additional electrical components such as a timer switch.

There is thus a need for a device for use with a smoke alarm which can easily be installed, permits easy handling of a battery during installation and removal, and allows the battery to be replaced from a location more readily accessible than the vicinity of the smoke alarm itself.

SUMMARY OF THE INVENTION

This need has largely been met by the device for replacing the battery of a smoke alarm provided herewith. That is to say, the device hereof is economical and enables the user to easily install or replace the battery in smoke alarm without the necessity of climbing a ladder. The device hereof provides a carriage which physically conveys the battery along a guide track between a site near the user to a connector for receiving the battery in electrical connection to the smoke alarm.

Broadly speaking, the device hereof includes a guide track or tube for the battery to move therealong, and a carriage for shifting the battery along the tube from a position proximate the user to the battery connector attached electrically to the smoke alarm. In some embodiments, the battery connector may be mounted outside the smoke alarm. Preferably, the carriage is configured to both convey the battery to the battery connector and push the battery into engagement so that the battery snaps into the connector, as well as to retrieve a spent battery from the battery connector to a position proximate the user so that a new battery can be installed. The tube or conduit is cooperatively configured with the battery and the battery connector so that the terminals of the battery are properly positioned to snap-connect with the battery connector without manual manipulation. A port is provided proximal to the user to facilitate easy replacement of a spent battery by merely pushing out the old battery and inserting a new one. The carriage is preferably shifted along the track by an elongated rod.

The device hereof can be manufactured as a part of the molded smoke alarm casing or designed for addition to an existing smoke alarm. The tube and rod can be made in different lengths in order to make it easy to grip the handle to remove and replace a battery. The device hereof is ideally designed to mount on the ceiling, but can also be mounted on a wall or similar upright surface. The device hereof is ideal for the elderly or handicapped who cannot stand on a footstool, chair or ladder to replace a battery and those who have difficulty because of arthritis or the like in grasping a battery and pulling it from the battery connector. The device hereof provides an easily graspable handle and avoids the necessity of climbing to a position near the smoke alarm to replace the battery. As a result, people will likely be more conscious of and receptive to the need to change the battery in their smoke alarm. The apparatus can be manufacturing by molding synthetic resin material in colors which are pleasing to the eye of the consumer and match the existing interior.

These and other advantages will be readily appreciated by reference to the drawings and detailed description of the preferred embodiment of the invention.

BRIEF DESCRIPTION OF THE DRAWINGS

FIG. 1 is a perspective view of the device for replacing the battery in a smoke alarm hereof;

FIG. 2 is a left side elevational view in partial section showing a port in the tube for replacing the battery, and the shiftable carriage for carrying the battery along the tube;

FIG. 3 is a vertical cross-sectional view taken along line 3—3 of FIG. 2 showing the battery attached to the battery connector;

FIG. 4 is a vertical cross sectional view similar to FIG. 3 but showing the carriage shifting downwardly to remove the battery from the battery connector;

FIG. 5 is a vertical cross-sectional view taken along line 5—5 of FIG. 2 showing the rod for shifting the carriage and the port for replacing the battery;

FIG. 6 is a right side elevational view of the device hereof with the carriage in the down position;

FIG. 7 is a vertical cross-sectional view taken along line 7—7 of FIG. 6 showing the battery adjacent the replacement port; and FIG. 8 is a vertical cross-sectional view similar to FIG. 7 showing the user's finger inserted through an access opposite the replacement port.

DESCRIPTION OF THE PREFERRED EMBODIMENT

Referring now to the drawing, a device 10 for replacing the battery 12 in a smoke alarm 14 broadly includes a guide track 16, a carriage 18 received within and shiftable along the guide track 16, a rod 20 for shifting the carriage 18 along the track, a conventional 9-volt battery connector 22 located for receiving the battery 12, and a mounting plate 24 for mounting the guide track 16 to a ceiling 26, wall 28 or other supporting surface. The guide track 16 is shown mounted in a generally upright orientation, but it is to be understood that it could be positioned at an angle or horizontally if such positioning enabled access to the smoke alarm from a stairway or landing.

A typical battery 12 for use with smoke alarms is a conventional 9-volt battery having a male positive terminal 30 and a female negative terminal 32. Such batteries would include, by way of example only, an Energizer® 9 V long life alkaline battery from Eveready® Battery Company, Inc. of St. Louis, Mo. Exemplary of the many smoke alarms 14 useful in conjunction with the device 10 hereof is First Alert Model SA 90LT by Pittway of Aurora, Ill. Such a smoke alarm 14 is modified so that wires 34 and 36 extend from the battery leads supplied with the unit and connect respectively to the negative connector 38 and the positive receiver 40 of the 9 volt battery connector 22 positioned at the upper or remote end 42 of guide track 16.

Guide track 16 is preferably in the form of an elongated tube 43 extending longitudinally upward as shown in the drawing and presents four normally orthogonal walls including side walls 44 and 46 and end walls 48 and 50. In the preferred embodiment shown, the side walls and end walls are formed of transparent synthetic resin such as Lucite, Plexiglas or polycarbonate for ease in viewing the position of the carriage 18 therein, although any other material could be used but might obscure the view of the interior of the tube 43. Stays 52 and 54 are glued, screwed, heat welded or otherwise secured to the outside of the side walls 44 and 46 respectively, and also to mounting plate 24. As shown in FIG. 5, a small spring-loaded detent 56 may be mounted by a bolt 58 to side wall 44 adjacent the proximate end 60 of the tube 43. The detent 56 is positioned to engage a cup 62 mounted on rod 20 for purposes as will be explained hereafter. A mounting flange 64 extends transversely from end wall 48 for securing the tube 43 to the support plate 24 by glue, screws, heat welding or other means of attachment. As shown in FIGS. 5, 7 and 8, tube 43 includes a bottom bar 66 which may be of synthetic resin or metal. The bottom bar 66 extends transversely across tube 43 between side walls 44 and 46. Bottom bar 66 serves to support the carriage 18 thereon when the rod 20 is shifted to bring the carriage 18 into the proximal position as shown in FIGS. 6, 7 and 8.

Rod 20 is connected at its remote end to carriage 18 as shown in FIGS. 3 and 4 and defines the axis along which the carriage 18 is reciprocally shifted within tube 43. Both carriage 18 and rod 20 may be made of the same synthetic resin material as tube 43. Carriage 18 includes a base 68, a platform 70, and a pair of connecting walls 72 and 74 terminating in retaining lips 76 and 78, best seen in FIG. 6. A pair of cotter pins 80 and 82 are inserted through rod 20 and positioned above and below base 68. Additionally, a washer 84 is positioned between cotter pin 80 and base 68.

Side wall 44 defines a port 86 therein which is large enough to permit the passage of battery 12 therein. Port 86 is located near the proximate end of the tube 43 so that when the rod 20 is retracted with base 68 in abutment with bottom bar 66, the platform 70 is substantially even with the bottom or most proximal edge 88 of port 86. An access 90 is positioned on side wall 46 opposite port 88 and is of sufficient size to permit an object such as a person's finger 92 to pass therethrough. To facilitate grasping rod 20, a handle 94 is provided at the proximate end of the rod. The handle 94 may be of any shape desirable for holding in one's hand.

It may be appreciated that the device 10 hereof is illustrated generally as an after market unit which utilizes an existing smoke alarm 14. If incorporated into the initial design of a smoke alarm, the outer casing of the alarm could be integrally molded with the tube 43 hereof and the battery connector 22 positioned so that the longitudinal axis of the tube is initially aligned therewith.

In use, the device 10 hereof would normally be found with the rod 20 and carriage 18 in the inserted position shown in FIGS. 1, 2 and 3. In this position, the battery 12 is electrically and physically connected to the battery connector 22 as shown in FIG. 3. It should be noted that the terminals of the battery and the connector and receiver of the battery connector snap fit together, requiring some force to dislodge the former from the latter. However, to ensure that the connection does not become loose over time due to the weight of the carriage 18 and rod 20, the detent 56 snaps into a corresponding recess in cup 62 to hold the rod 20 so that the carriage 18 remains in the inserted position. If the battery 12 requires replacement, the user pulls down on the handle 94 in a retrieval stroke. This initiates movement of the rod and the carriage toward the proximate end 60. The retaining lips 76 and 78 pull down on the battery 12 to pull it away from the battery connector 22 as shown in FIG. 4. The rod 20 is pulled toward proximate end 60 until the base 68 rests in engagement with bottom bar 66.

The user may then insert his or her finger 92 through access 90 and push battery 12 out through port 86. The connecting walls 72 are spaced just far enough to receive battery 12 therebetween, and thus when the user inserts a new battery 12 through port 86 and onto platform 70, it is properly positioned for reconnection to battery connector 22. The user then need only grasp the handle 94 and shift the rod 20 to move the carriage 18 within the tube 43 toward the battery connector 22 in an installation stroke. It may be appreciated that the tube 43 is shown as substantially imperforate and the carriage is cooperatively sized within the tube to prevent the battery 12 from moving off of the platform 70 of the carriage 18 during its movement along the tube 43. When the rod 20 is fully shifted into the inserted position, provided the battery 12 has been inserted with its terminals 30 and 32 properly oriented, the battery 12 snap-connects with the battery connector 22 as the platform 70 pushes the bottom of the battery. The detent 56 holds the rod 22 in the inserted position until ready for the next use.

It may be appreciated that the invention hereof may be readily modified by those skilled in the art and still fall within the scope of the invention. For example, if the smoke alarm 14 operated from a cylindrical battery such as, for example, a AA cell, then the tube and carriage could be modified to carry and retrieve that battery from a corresponding and cooperatively configured battery connector. Similarly, the guide track 16 could be configured as a pair of opposing channels with an opening therebetween or as a single track along which the carriage shifts. Accordingly, it is out intention to have all such modifications encompassed by the doctrine of equivalents and for the scope of the invention to be determined solely by the following claims.

We claim:

1. A device for replacing a battery in a smoke alarm having a battery connector operably connected to the smoke alarm, said device comprising:
    a guide track having a remote end adjacent the battery connector and a proximate end located relatively remote from the battery connector; and
    means shiftable within and along said guide track between said remote end and said proximate end for carrying the battery said shiftable means comprising a rod extending longitudinally along said guide track and having a remote end and a proximal end and a carriage coupled to said rod at the remote end thereof for carrying the battery within and along said guide track, said rod being shiftable along said guide track to move the carriage and the battery between the battery connector and said proximate end of the guide track.

2. A device for replacing a battery in a smoke alarm as set forth in claim 1 wherein said guide track includes structure for retaining said shifting means therewithin.

3. A device for replacing a battery in a smoke alarm as set forth in claim 2 wherein said retaining structure comprises a bar positioned transversely across said guide track adjacent said proximate end.

4. A device for replacing a battery in a smoke alarm as set forth in claim 1 including a graspable handle located on the proximal end of said rod.

5. A device for replacing a battery in a smoke alarm as set forth in claim 1 wherein said carriage includes at least one retaining member for pulling the battery away from the battery connector.

6. A device for replacing a battery in a smoke alarm as set forth in claim 1 wherein said carriage includes means for pushing the battery into electrical engagement with the battery connector.

7. A device for replacing a battery in a smoke alarm as set forth in claim 1, including means attached to said guide track for retaining the shiftable means in an inserted position when the battery is attached to the battery connector.

8. A device for replacing a battery in a smoke alarm as set forth in claim 7 wherein said retaining means comprises a detent.

9. A device for replacing a battery in a smoke alarm as set forth in claim 1 wherein said guide track presents a pair of side walls, at least one of said side walls presenting a port adjacent the proximate end of the guide track sized for permitting the passage of the battery therethrough.

10. A device for replacing a battery in a smoke alarm as set forth in claim 9 wherein the other of said side walls presents an access opposite to said port.

11. A device for replacing a battery in a smoke alarm as set forth in claim 1 including a support plate for mounting the smoke alarm, the battery connector, and the guide track thereon.

12. A device for replacing a batter in a battery powered apparatus having a battery connector, said device comprising:
    an elongated guide track having a remote end adjacent the battery connector and a proximate end relatively remote therefrom;
    means for carrying a battery along said guide track; and
    means for shifting said carrying means along said guide track between the remote end and the proximate end, said shifting means comprising a rod extending longitudinally along said guide track and coupled with said carrying means, said rod being shiftable along said guide track to move said carrying means and the battery between the battery connector and said proximate end of the guide track.

13. A device for replacing a battery as set forth in claim 12 wherein said guide track comprises an elongated tube including a port defined in said tube adjacent the proximate end thereof for permitting the passage of the battery therethrough.

14. A device for replacing a battery as set forth in claim 13 including an access defined by said tube opposite said port.

15. A device for replacing a battery as set forth in claim 12, wherein the battery presents a pair of terminals thereon, and wherein said carrying means comprises a carriage configured to receive the battery with the terminals oriented along the guide track and toward the battery connector.

16. A device for replacing a battery as set forth in claim 12 wherein said guide track is transparent.

* * * * *